United States Patent [19]

Rao

[11] Patent Number: 4,475,636
[45] Date of Patent: Oct. 9, 1984

[54] WATER BRAKE

[75] Inventor: Jayanth P. Rao, Sugarland, Tex.

[73] Assignee: Baylor Company, Sugarland, Tex.

[21] Appl. No.: 374,925

[22] Filed: May 4, 1982

[51] Int. Cl.³ .............................................. F16D 57/02
[52] U.S. Cl. ................... 188/296; 188/264 E; 60/336; 60/339
[58] Field of Search ................ 188/264 E, 290, 293, 188/296; 192/3.21, 3.23, 12 A, 58 A; 415/112; 60/336, 337, 339, 363, 364

[56] References Cited

U.S. PATENT DOCUMENTS

| | | | |
|---|---|---|---|
| 2,733,778 | 2/1956 | De la Mater et al. | 188/296 |
| 3,016,991 | 1/1962 | Lyne | 188/296 |
| 3,166,161 | 1/1965 | Hayes | 188/296 |
| 3,330,386 | 7/1967 | Bertram et al. | 188/296 |
| 3,467,225 | 9/1969 | Steffan et al. | 188/296 |
| 3,744,598 | 7/1973 | Hanke et al. | 188/296 |
| 3,774,735 | 11/1973 | Hanke et al. | 188/296 |
| 3,860,097 | 1/1975 | Braschler et al. | 188/296 |
| 3,888,335 | 6/1975 | Hanke | 188/296 |

*Primary Examiner*—Douglas C. Butler
*Assistant Examiner*—R. R. Diefendorf
*Attorney, Agent, or Firm*—Shlesinger Arkwright Garvey & Fado

[57] ABSTRACT

A simplified water brake unit has greater capacity per unit weight and is readily maintained due to a two piece readily disassembled housing, one part of which provides a firm, accurate support for the stator, and which also has longer seal life because of a seal chamber bleed which relieves the high pressure from behind the inner high pressure seal by providing a communication to the inlet.

8 Claims, 2 Drawing Figures

WATER BRAKE

BACKGROUND OF INVENTION

This invention relates to water brake units. Water brake units previously in general use have been relatively large and heavy, were not capable of being readily maintained in the field. The water brake of the present invention is designed to improve upon previous units in this regard, and to provide for longer bearing seal life in such units.

SUMMARY OF INVENTION

Accordingly, it is a feature of this invention to provide an improved water brake construction. More specifically, it is a feature of this invention to provide an improved water brake construction which has more capacity per unit weight, less parts, is more readily maintained, and also has longer seal life.

These and further features of this invention will become apparent from the following description of the drawings.

DESCRIPTION OF THE INVENTION

Figure 1:
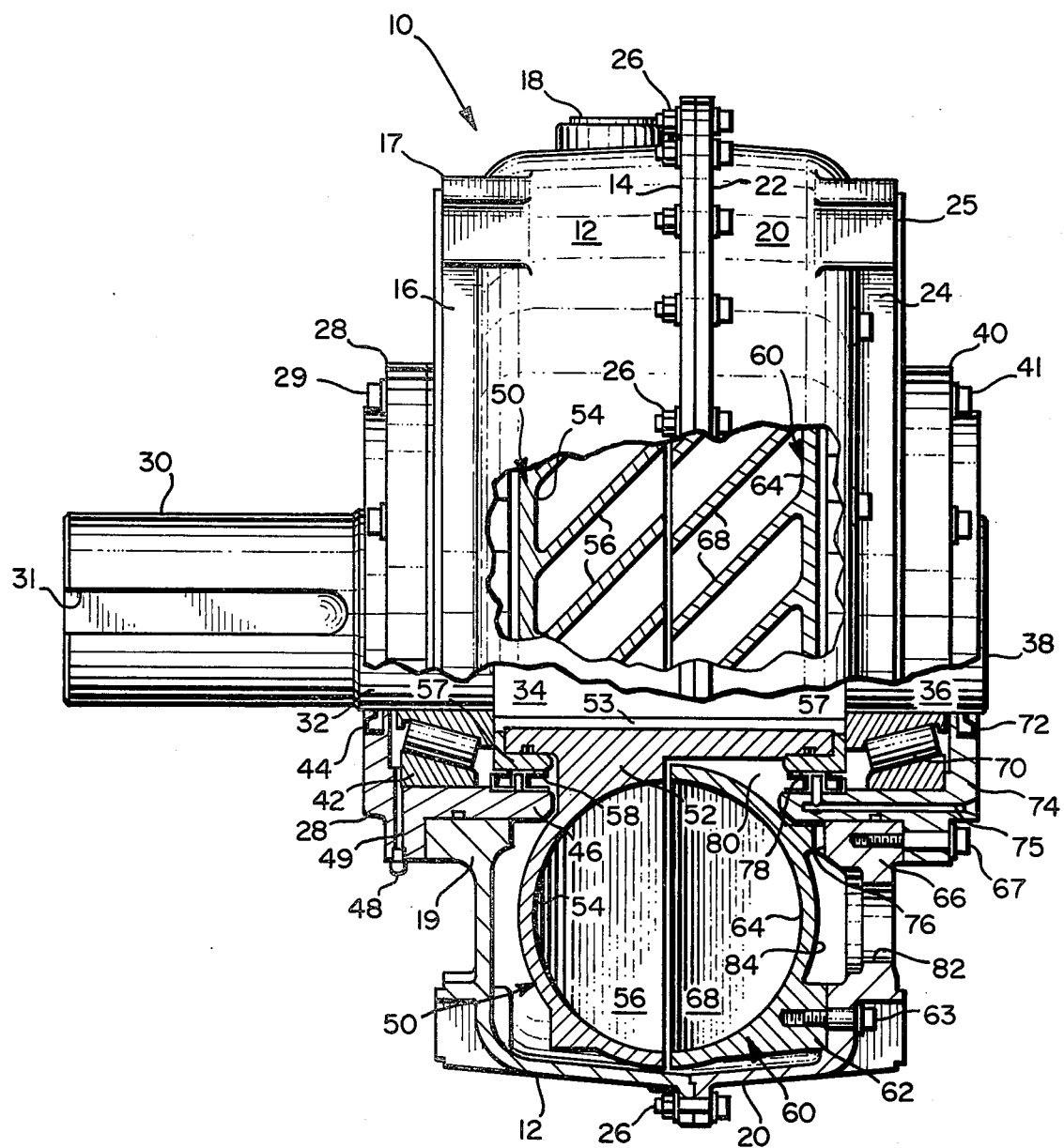
FIG. 1 is a side view partially in section and partially cut away of the water brake of the subject invention.

Referring to the drawings, the water brake generally indicated at 10 has an outlet housing 12 of circular shape with an outer peripheral flange 14 and an inner flange 16. A plurality of support lugs 17 are integral with the housing and are connected to the peripheral flange 16. At the top of the housing there is an outlet opening 18 which has an internally threaded section for receiving a fitting. The outlet housing has a flat annular section 19 disposed between the flange 16 and is inwardly recessed therefrom.

An inlet housing 20 has an outer peripheral assembly flange 22 corresponding to assembly flange 14 with which it joins. There is an inner peripheral flange 24 which corresponds to inner peripheral flange 16 of the outlet housing 12. Lugs 25 correspond to lugs 17 on the outlet housing. The inlet housing 20 and the outlet housing 12 are jointed together by the matching peripheral assembly flanges which are held together by a plurality of spaced nut and bolt assemblies 26.

A carrier seal housing 28 fits into the annular opening within the inner peripheral section 19 of the outlet housing 12 in tight-fitting engagement and is held in position by bolts 29.

The drive and central support shaft has a drive section 30 with a slot 31. A stepped intermediate shoulder-bearing support section 32 is disposed immediately within the carrier seal housing 28. The housing has a central rotor support section 34 and an end bearing support section 36 with an end face 38. The shaft provides the central mounting element for the unit and the stepped arrangement of the sections 32, 34, and 36 provide a compact sturdy construction for support of the basic elements of the water brake unit.

The inlet housing carrier seal assembly 40 has the same shape as the carrier seal assembly 28 and is mounted in similar fashion within the inlet housing 20. It is held in position by a plurality of bolts 41 which threadedly engage the periphery adjacent the opening in the inlet housing. The housing members are supported on the shaft by spaced bearings, and the stator and rotor assemblies are mounted therebetween.

The outlet housing bearing 42 is mounted on the step 32 of the shaft and it in turn is mounted within the annular flange configured carrier seal housing 28 in direct contact with the inner periphery of the inwardly extending annular flange section 46 of the carrier seal housing 28. A grease fitting 48 is connected to the elongated grease passageway 49 to supply grease to the cavity between the bearing 42 and the lip seal 44.

The rotor, generally indicated at 50, has a wide cylindrical hub section 52 which is mounted upon the central step 34 of the shaft and is held in fixed position with respect to the shaft by the key 53. The rotor 50 has a circular vane support section 54 of C-shaped cross-sectional configuration on which a plurality of radially extending angularly inclined vanes 56 are mounted. On each end of the hub section 52 annular L-shaped cross section seal sleeves 57 are mounted adjacent O-ring seals on the outer periphery of the hub 52. A double lip seal 58 is disposed about the seal sleeve 57 adjacent bearing 42.

The stator, generally indicated at 60, is supported within the housing along an annular lug section 62 by a series of circularly spaced lock washer secured bolts which are threadedly engaged within the annular section 62 to hold the stator in fixed accurate position within the interior of the inlet housing 20. The stator has a circular disc of generally C-shape section 64 which matches the shape and configuration of the rotor support section 54. It is further supported by the circular support section 66. The plurality of radially extending spaced parallel vanes 68 are mounted on the vane support section 64 in a parallel and angular relationship which matches the spacing and angular relationship of the radially extending vanes 56 of the rotor 50.

The inlet housing 20 is supported on the shaft through the bearing 70 mounted on the end shaft section 36. The roller bearing 70 supports the annular L-shaped carrier seal housing 74 which fits within the inlet housing annular lug section 66. It is fastened adjacent its edge to the section by circular roll of bolts 41, one of which specifically is shown at 67 in the sectional cross section of FIG. 1.

A high pressure cavity 80 tends to form immediately adjacent the double seal 78. This high pressure contributed to failure of the bearing 70. It has been found that such condition can be alleviated by cutting slots 76 along the periphery of the stator to connect the high pressure cavity 80 with the inlet feed cavity adjacent rear surface 84 of the stator immediately adjacent the inlet opening 82 of the inlet housing 20. This has resulted in a substantial drop in pressure, such that pressures in the range of 130 PSI at high operating speeds were reduced to approximately 42 PSI.

Figure 2:
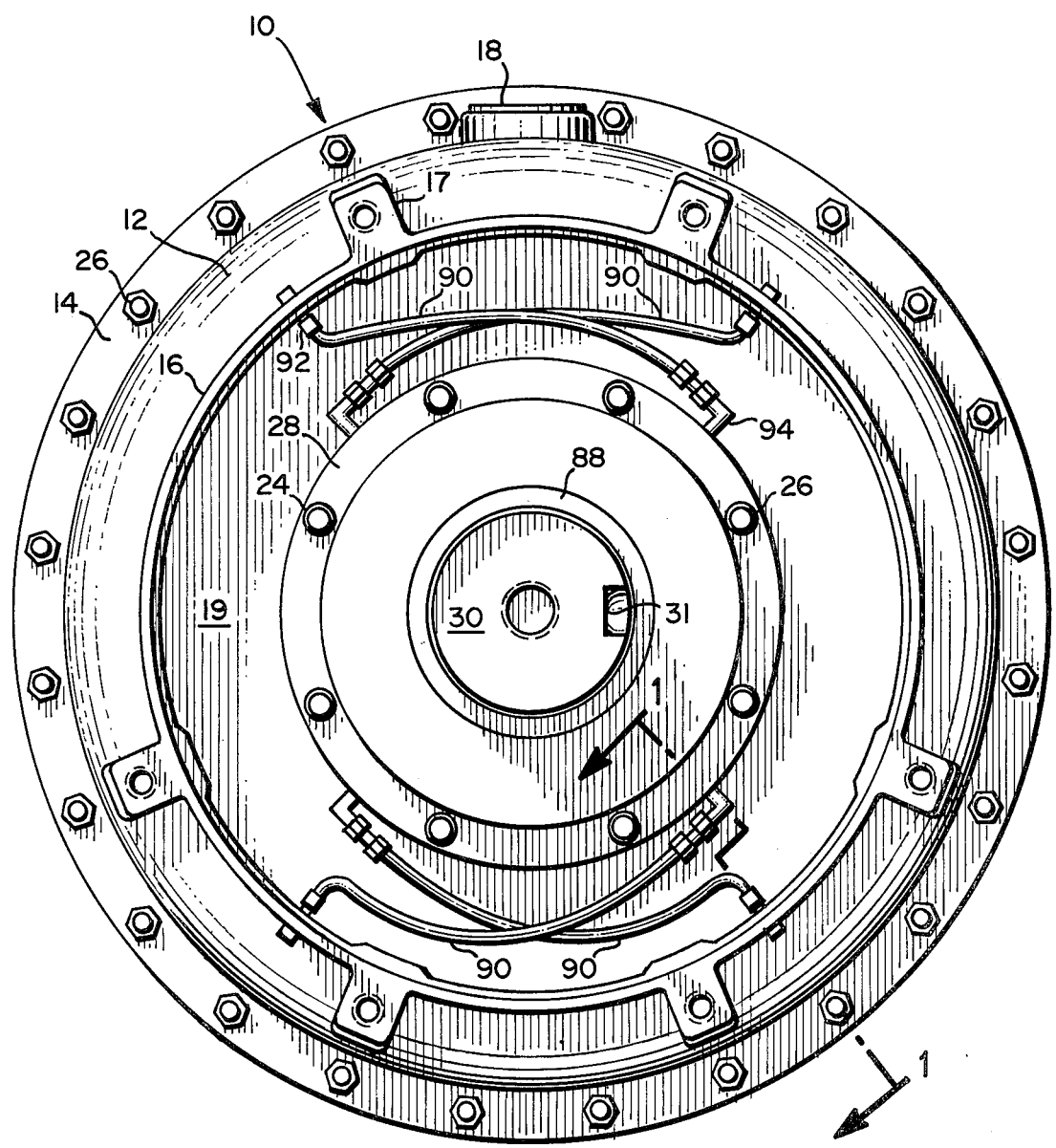
FIG. 2 is an end view of the unit of FIG. 1.

The grease fitting 48 on the outlet housing carrier seal assembly is connected to grease supply lines 90 which supply grease through fittings 92 and 94 to the fittings 48. It will be noted in FIG. 2 that four such grease lines 90 are used.

Accordingly, it will be seen that the assembly provides a two-part brake housing unit which can readily be disassembled by the removing of the bolts 26 separating the flange 14 and 22 of the inlet and outlet housings. The shaft acts as a support for the entire assembly in that the two spaced bearings at either side of the brake housing support the inlet and outlet housings respectively. In addition, the rotor 50 is fixedly mounted on the shaft immediately between the two bearings. The seal and bearing assemblies are readily removed at each end by removing the bolts which hold them in position on the housing, so that all parts of the assembly are readily removed. The inlet and outlet housings are held together by the flanges along the outer peripheral edge of the brake housing unit, and sealing elements maintain a water-tight seal between these housing sections.

Consequently, there is provided a simplified water brake assembly, which is readily disassembled in the field. Further, the elements are so arranged that a substantial reduction in weight is accomplished by the use of less complex parts, while maintaining the capacity of previous type water brake units of greater weight and size.

In addition, the unit is provided with lip seals which will provide long life. One of the potentially troublesome areas in this regard is the area 80 immediately behind the stator in which there is a tendency for a high pressure buildup when the unit is running at high capacity. This has been recognized and special provision has been made for eliminating this by providing for a pressure relief area which is directly connected through slots 76 to the inlet pressure area 84 adjacent the central water inlet supply area.

While this invention has been described as having a preferred design, it will be understood that it is capable of further modification. This application is therefore intended to cover any variations, uses, or adaptations of the invention following in general the principle of the invention and including such departures from the present disclosure as come within known or customary practice in the art to which the invention pertains, and as may be applied to the essential features hereinbefore set forth, as fall within the scope of the invention or the limits of the appended claims.

What is claimed is:

1. A water brake comprising:
   (a) a hollow relatively wide substantially wheel-shaped brake housing having an outer substantially circular peripheral surface and two spaced and parallel substantially flat circular side walls each of which has a central axial opening,
   (b) the brake housing formed by two housing sections which are joined along a circular planar surface along the outer circular peripheral surface,
   (c) a seal and bearing assembly containing a roller bearing and an adjacent outer seal mounted in the central opening of each of the side walls and disposed along a central axis extending through the brake housing,
   (d) a single drive and support shaft extending along the central axis and through and in engagement with the roller bearing and an adjacent seal in each of the seal and bearing assemblies,
   (e) a rotor disposed within one housing section and having a cylindrical hub mounted on the shaft and supported between the bearings of the two seal and bearing assemblies,
   (f) the rotor having a circular vane support section of cup-shaped cross-section having inner and outer peripheral surfaces and within which a plurality of radially extending vanes are supported,
   (g) the vanes extending in an angled direction with respect to the line of travel of the rotor and terminating their free edges with the outer and inner edges of the vane support section at a first common plane disposed perpendicular to the hub axis,
   (h) a complementary configured stator fixedly mounted within the other housing section and including a thin circular radially extending vane support section facing the rotor vanes and which has a plurality of radially extending vanes extending in a direction parallel to those of the rotor and terminating at an edge along a second common plane extending parallel and closely spaced from said first common plane,
   (i) water inlet and outlet means associated with the housing for maintaining a supply of water through the housing which is engaged by the rotor and stator vanes,
   (j) inner high pressure seal means disposed between the bearings and the cup-shaped vane support of the rotor and stator for providing a water seal,
   (k) the opposed rotor and stator vane support sections defining a high-pressure chamber in which the edges of their inner and outer peripheral surfaces are disposed close to each other along the first common plane to restrict leakage of the working fluid from the annular chamber formed between the rotor and stator to maintain high pressure,
   (l) an annular high pressure chamber adjacent the annular gap formed between the rotor and stator peripheral surfaces and the inner seal means, and
   (m) high pressure bleed off means connected between the high pressure chamber and a lower pressure area for reducing high pressure build-up within the high pressure chamber.

2. The water brake assembly as set forth in claim 1, wherein:
   (a) the seal is connected to an external bearing assembly grease supply through a grease conduit.

3. The water brake assembly as set forth in claim 1, wherein:
   (a) the vane support elements of both the rotor and stator are C-shaped in cross section.

4. The water brake assembly as set forth in claim 1, wherein:
   (a) each seal and bearing assembly has an outer circular periphery which fits within and engages the periphery of the housing immediately adjacent the central axial opening, and
   (b) the seal and bearing assembly has an outer circular flange immediately adjacent the central axial opening and directly engages the outer surface of the housing, and
   (c) the flanges and the portion of the housing which is being engaged, are adapted to receive fastening elements, and
   (d) fastening elements extending through said flanges and into engagement with the housing for holding the seal and bearing assemblies in position.

5. The water brake as set forth in claim 1, wherein:
   (a) a cylindrical hub extends across the width of the housing approaching at each end thereof the bearing and seal assemblies,
   (b) the first common plane to which the rotor vanes extend is positioned at approximately the center of the housing width, and
   (c) the vane support section of the stator is disposed immediately adjacent a seal and bearing assembly and the portion of the rotor hub extending beyond the first common plane so as to define a high pressure cavity between the outer periphery of said hub portion, the inner seal means and the outer surface of the inner periphery of the stator.

6. The water brake assembly as set forth in claim 5, wherein:
   (a) the water inlet means is an opening disposed in the side of the housing immediately adjacent and behind the central section of the stator, and
   (b) the pressure relieving means includes a connecting passage between the water inlet and the high pressure chamber immediately adjacent the inner seal means.

7. The water brake as set forth in claim 6, wherein:
   (a) the matching substantially circular planar surfaces are disposed approximately in line with the first common plane,
   (b) each housing has a matching outwardly extending annular connecting flange with a precision-made annular engaging surface which engages the corresponding engaging surfaces of the opposed housing, and
   (c) fastening means extending through both flanges to hold the housings in firm sealed contact with each other.

8. The water brake as set forth in claim 1, wherein:
   (a) the matching substantially circular plane surfaces are disposed approximately in line with the first common plane,
   (b) each housing has a matching outwardly extending annular connecting flange with a precision made annular engaging surface which engages the corresponding engaging surface of the opposed housing, and
   (c) fastening means extending through both flanges to hold the housings in firm sealed contact with each other.

* * * * *